(No Model.)
W. M. HABIRSHAW.
INSULATED CONDUCTOR.
No. 538,020. Patented Apr. 23, 1895.
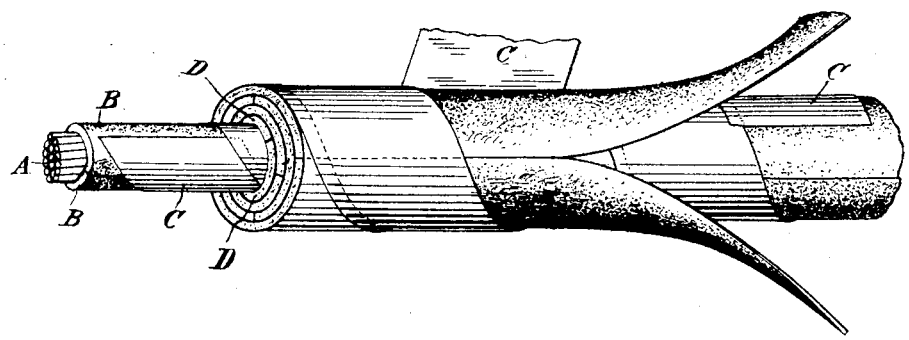
Witnesses:
Raphael Netter
James H. Catlaw
Inventor
William M. Habirshaw
by Duncan & Page
Attorneys

UNITED STATES PATENT OFFICE.

WILLIAM M. HABIRSHAW, OF NEW YORK, N. Y.

INSULATED CONDUCTOR.

SPECIFICATION forming part of Letters Patent No. 538,020, dated April 23, 1895.

Application filed October 16, 1894. Serial No. 526,023. (No model.)

*To all whom it may concern:*

Be it known that I, WILLIAM M. HABIRSHAW, a citizen of the United States, residing at New York, in the county and State of New York, have invented certain new and useful Improvements in Insulated Conductors, of which the following is a specification, reference being had to the drawing accompanying and forming a part of the same.

The insulated conductor and method or process of manufacturing the same herein described and forming the subject of this application for Letters Patent, involve the invention or discovery of an improvement in the art of insulating electrical conductors, made by myself in efforts to meet the practical requirments of the conductors of systems for transmitting electrical energy particularly to great distances and on a very extended scale.

In its best and preferred form the invention is illustrated in the accompanying drawing in which a short length of conductor is shown with its several layers of insulation partially exposed, and as they appear immediately after application and prior to undergoing the final process of vulcanization.

A designates the conductor or core which may be composed of numerous strands or wires, generally of copper, tinned or otherwise coated with non-oxidizable metal in the usual way. Around the conducting core and in contact therewith is applied a layer of soft vulcanizable rubber B. This in turn is covered by a layer of "cut sheet" or "brown rubber" C and over this is a second layer of soft vulcanizable rubber D. The insulated covering may in this manner be built up of alternate layers of soft vulcanizable rubber and "cut-sheet" to the required thickness, the number of such layers being in a measure arbitrary, the essential feature being that the core is surrounded by layers of soft vulcanizable rubber and cut sheet alternately disposed in the order named.

The term "soft vulcanizable rubber" used herein includes such a product as may contain from thirty-five to forty per cent. of pure Para rubber, compounded with red oxide of lead, oxide of zinc, talc and sulphur and is not in itself a new or unusual article of commerce.

The terms "cut sheet" or "brown rubber" are intended to include a well-known article of manufacture technically known by these terms. This material, generally imported from England or France, is composed of the best Para or Bolivian rubber which has been washed, dried, formed into blocks under exceedingly heavy hydraulic pressure, subjected to a low temperature and then cut into thin sheets. The peculiar property of this material which renders it valuable for the purpose to which I apply it, is its density and freedom from pores or air spaces which renders it very highly impervious to moisture.

The method or process of manufacturing the insulated conductor which I have devised is as follows: The soft vulcanizable rubber is calendered to a thickness of about one milimeter; cut in strips and then applied to the opposite sides of the core longitudinally by grooved rollers with cutting edges such as are usually employed for this purpose. Each subsequent layer of this material is applied in the same manner, the thickness of the strips and relative sizes of the rollers and core furnishing the requisite pressure for insuring perfect contact and solidity. The brown rubber is cut in strips or tapes which are stretched from six to eight times their normal length, or to practically their limit of elasticity, and wound on the ordinary taping bobbins from which they are wound spirally and so as to overlap, over the layer or layers of soft vulcanizable rubber. After the insulating covering has been built up in this way by the desired number of layers, it is subjected to the ordinary process of vulcanization by which means the soft rubber vulcanizes the cut sheet by contact.

The conductor as a whole may be further protected or coated, if so desired, in any known manner.

Previous to my invention cut sheet, and soft vulcanizable rubber had been used in layers in the insulating covering of cables and conductors, but the cut-sheet was applied next to the conductor, and was protected from the action of the sulphur in the soft rubber by an intermediate layer which though partially vulcanized itself by contact with the soft rubber prevented any action of the sulphur upon the cut-sheet. It resulted from this that when the conductor was heated by being overloaded, the cut-sheet was softened, being reduced to the consistency of treacle in which condition it is easily perforated under high electrical pressure. A sheathing of the kind herein described, however, and in which the layers of the two materials alternate, so that a layer of cut-sheet is interposed between two layers of soft vulcanizable rubber preserves its impervious qualities to a high degree, so that the conductor may be used under water, with higher current densities and greater pressure than when the cut-sheet is absent or when applied as heretofore so as not to be capable of the same degree of vulcanization by contact.

What I claim as my invention is—

1. The combination with a conducting core of an insulating coating or covering composed of contiguous layers of soft vulcanizable rubber and cut-sheet alternately applied and vulcanized, as set forth.

2. The combination with a conducting core of an insulating coating or covering composed of alternate layers of soft vulcanizable rubber and cut-sheet applied to the core in the order named and vulcanized, as set forth.

3. The combination with a conducting core of an insulating coating or covering composed of alternate layers of soft vulcanizable rubber, and spirally wound strips of cut-sheet, applied to the core in the order named and vulcanized, as set forth.

4. The combination with a conducting core of an insulating coating or covering composed of strips of soft vulcanizable rubber laid longitudinally and spirally wound overlapping strips of cut-sheet, applied around the core in the order named in alternate layers and vulcanized, as set forth.

5. The method of insulating conductors herein described which consists in applying to a conducting core strips of soft vulcanizable rubber longitudinally winding spirally upon the same strips or tapes of cut-sheet, so as to form alternate layers of the two materials and vulcanizing the same, as set forth.

Signed at New York this 11th day of October, 1894.

W. M. HABIRSHAW.

Witnesses:
L. LAWTON,
FRED J. HALL.